(12) United States Patent
Hung

(10) Patent No.: US 6,988,319 B2
(45) Date of Patent: Jan. 24, 2006

(54) LEVEL-MEASURING CIRCUIT OF A LASER TILT METER

(75) Inventor: Chih-Wei Hung, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 10/865,157

(22) Filed: Jun. 10, 2004

(65) Prior Publication Data

US 2005/0188555 A1    Sep. 1, 2005

(30) Foreign Application Priority Data

Mar. 1, 2004    (TW)  .............................. 93105317 A

(51) Int. Cl.
 G01C 9/06        (2006.01)
 G01C 15/00       (2006.01)
(52) U.S. Cl. .......................................... 33/291; 33/286
(58) Field of Classification Search .................... None
 See application file for complete search history.

(56) References Cited

U.S. PATENT DOCUMENTS

| 4,035,084 | A | * | 7/1977 | Ramsay ................. 356/139.08 |
| 4,993,161 | A | * | 2/1991 | Borkovitz .................... 33/291 |
| 5,485,266 | A | * | 1/1996 | Hirano et al. ................ 356/249 |
| 5,784,794 | A | * | 7/1998 | Nelson ..................... 33/366.14 |
| 6,243,658 | B1 | * | 6/2001 | Raby .......................... 702/151 |
| 6,625,896 | B1 | * | 9/2003 | Olson ...................... 33/366.15 |
| 6,688,011 | B2 | * | 2/2004 | Gamal et al. .................. 33/290 |
| 6,691,420 | B2 | * | 2/2004 | Tamamura ................... 33/286 |
| 6,922,063 | B2 | * | 7/2005 | Heger ......................... 324/658 |
| 2004/0187326 | A1 | * | 9/2004 | Yung et al. ................... 33/286 |

* cited by examiner

Primary Examiner—Christopher W. Fulton
(74) Attorney, Agent, or Firm—Thomas, Kayden, Horstemeyer & Risley

(57) ABSTRACT

A signal sampling circuit of a tilt sensor, suitable to be used in a tilt sensor, is described. The signal sampling circuit has a signal-generating module, a sample and hold module, and a differential module. The signal-generating module regularly generates a plurality of level-measuring signals at equally timed intervals and unidirectionally and alternately sends them to the first input pin and the second input pin of the tilt sensor, respectively. Then, the tilt sensor sequentially outputs the corresponding first and second output signals. The sample and hold module alternately samples and holds the first and the second output signals and outputs the first and the second sampling signals, respectively. The differential module receives and differentiates the first and the second sampling signals and outputs a level-estimating-result signal to a micro-controller unit to derive the tilt information of one direction.

34 Claims, 7 Drawing Sheets

LEVEL-MEASURING CIRCUIT OF A LASER TILT METER

FIELD OF THE INVENTION

The present invention relates to a level-measuring circuit, and more particularly, to a level-measuring circuit of a laser tilt meter, set in a device, suitable to measure the tilt angle between the device and the horizon and further to do the leveling.

BACKGROUND OF THE INVENTION

In architecture, when demarcating moldings and leveling the ceiling with the ground, keeping a tilt meter horizontal to the ground all the time is an important issue. At present, bubble levels are most often employed to do leveling, but the situation of inaccurate readings often happens when doing leveling with bubble levels.

FIG. 1 illustrates a schematic diagram of a conventional leveling device in a tilt meter. As shown in FIG. 1, the plumb 101 is always perpendicular to the horizontal by gravity. Such a tilt meter can be used on any kind of ground, and since the plumb 101 is always perpendicular to the horizontal by gravity, the laser scanning apparatus associated with the plumb can indicate the horizontal status precisely. Although determining the horizontal by the plumb is a simple and effective method, the horizontal status only can be measured until the swinging plumbtakes some time to be still. The usefulness of this kind of leveling device is therefore not optimum.

Another kind of laser tilt meter exists which determines the horizontal by using a level-measuring circuit comprising a tilt sensor, which associates with a laser transmitter to cast horizontal rays of light. Tilt sensors can be classified into two kinds. One is the single axis tilt sensor, and the other is the dual axis tilt sensor. The single axis tilt sensor measures the slant of one direction, whereas the dual axis one estimates the slant of a plane.

The principle of how the tilt sensor works is illustrated in FIG. 2. It is known that the conductivity between two electrodes is proportional to the length of electrode immersed in an electrolyte. As ground is not in horizontal status, the surface of the electrolyte in the tilt sensor remains level due to gravity. The electrolyte is electrically conductive, and since the conductivity between the two electrodes is proportional to the length of electrode immersed in the electrolyte, the resistance changes in proportion to the tilt angle. Therefore, the slant of the tilt sensor is derived from the resistance corresponding to the tilt angle.

FIG. 3 illustrates the input method of a dual axis tilt sensor. Four outer electrodes, A, B, C and D, are placed in a crisscross arrangement as signal inputs, and both axes share the center electrode O as a signal output. In the tilt sensor 301, electrodes A and B are signal inputs, electrodes C and D are grounded, and electrode O is the signal output, wherein electrodes A and C represent the input of one direction and electrodes B and D represent the input of the other direction. A switch (not shown in the drawing) is further included in the tilt sensor 301 to completely disconnect one axis while the other is active. Additionally, to prevent the electrolyte of the tilt sensor 301 be electrolyzed, the DC components of the input signals must be zero. Therefore, symmetric square waveforms are used to be the input signals.

SUMMARY OF THE INVENTION

Hence, an objective of the present invention is to provide a level-measuring circuit of a laser tilt meter to measure the tilt angle between a device and the horizontal and further to do the leveling.

According to the aforementioned objectives, a level-measuring circuit of a laser tilt meter, set in a device, is provided, which is suitable to measure the tilt angle between the device and the horizontal and further to do the leveling. The level-measuring circuit comprises a signal-generating module, an amplifier or a rectifying and filtering device, and a micro-controller unit. The signal-generating module regularly generates a plurality of level-measuring signals with positive and negative voltages at equally timed intervals and sends the signals to the input pin of the tilt sensor in one-way. Then, according to the variation of slant status, the tilt sensor outputs a plurality of corresponding positive and negative output signals to the amplifier or the rectifying and filtering device. The amplifier receives and amplifies the positive and negative output signals and then sends them to the micro-controller unit. Alternatively, the rectifying and filtering device receives, rectifies and filters the positive and negative output signals and sends them to the micro-controller unit. The micro-controller unit receives the amplified or rectified and filtered output signals. It then samples and averages the amplified or rectified and filtered output signals in accordance with a preprogrammed sampling frequency and differentiates the averages of the output signals with positive and negative voltage to generate a plurality of level-estimating result signals. By comparing the level-estimating result signals with a data table preprogrammed in the micro-controller unit, the tilt angle of at least one direction is obtained.

According to the objectives of the present invention, a signal processing method of a level-measuring circuit of a laser tilt meter is provided. First, a signal-generating module regularly generates a plurality of level-measuring signals with positive and negative voltages at equally timed intervals and unidirectional sends them to the input pin of the tilt sensor. The output pin of the tilt sensor, in an order corresponding to the level-measuring signals, outputs a plurality of output signals with positive and negative voltages to the amplifier or the rectifying and filtering device. The amplifier receives and amplifies the positive and negative output signals and then sends them to the micro-controller unit. Alternatively, the rectifying and filtering device receives, rectifies and filters the positive and negative output signals and sends them to the micro-controller unit. The micro-controller unit samples and averages the amplified or the rectified and filtered output signals with positive and negative voltages by use of a sampling frequency preprogrammed in the micro-controller. Then, the averages of the positive and negative voltages of the output signals are differentiated to generate a plurality of level-estimating result signals, which are held until the next cycle. Finally, by comparing the level-estimating result signals to the table preprogrammed into the micro-controller unit, the tilt angle of at least one direction is acquired.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, where.

DETAILED DESCRIPTION OF THE PREFERRED EMBODIMENT

The present invention discloses a level-measuring circuit of a laser tilt meter suitable to measure the tilt angle between a device and a horizontal and further to do the leveling. When the level-measuring circuit works, input a square waveform signal to the input pins of the tilt sensor in alternating order. To prevent the electrolyte from being polarized, the DC components of the input signal must be zero. Hence, the input signal should be a square waveform signal with symmetric positive and negative voltage. When the dual axis tilt sensor is not horizontal, the resistance between the two electrodes is changed in proportion to the tilt angle, so a reduced or amplified output signal is obtained. By analyzing the voltage of the output signal, the tilt angle of one direction or one plane is obtained.

Figure 1:
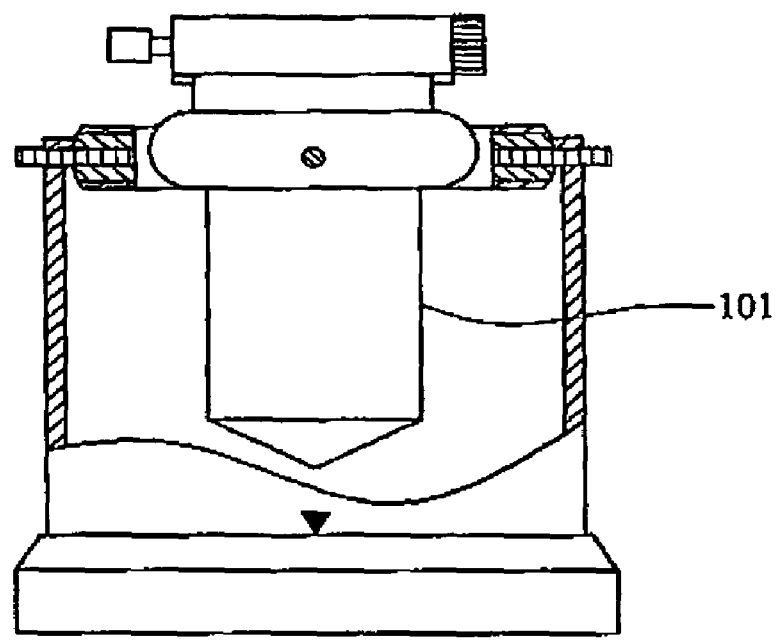
FIG. 1 illustrates a schematic diagram of a conventional leveling device in a tilt meter.
Figure 2:
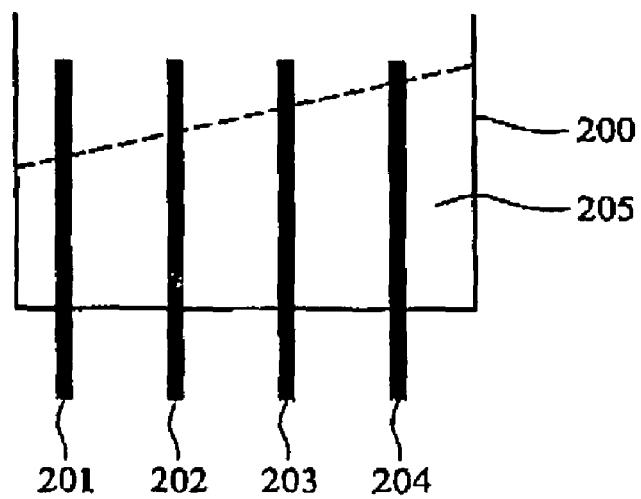
FIG. 2 illustrates the principle of how the tilt sensor works.
Figure 3:
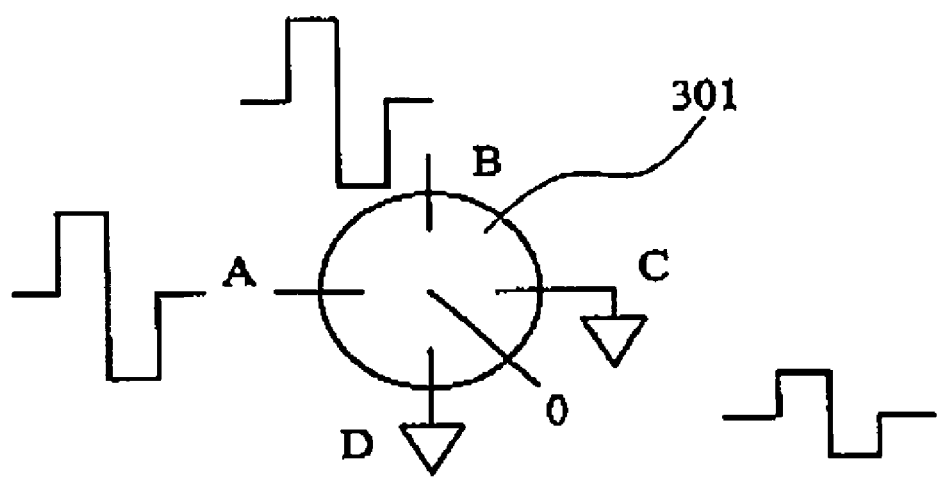
FIG. 3 illustrates the input method of a dual axis tilt sensor.
Figure 4:
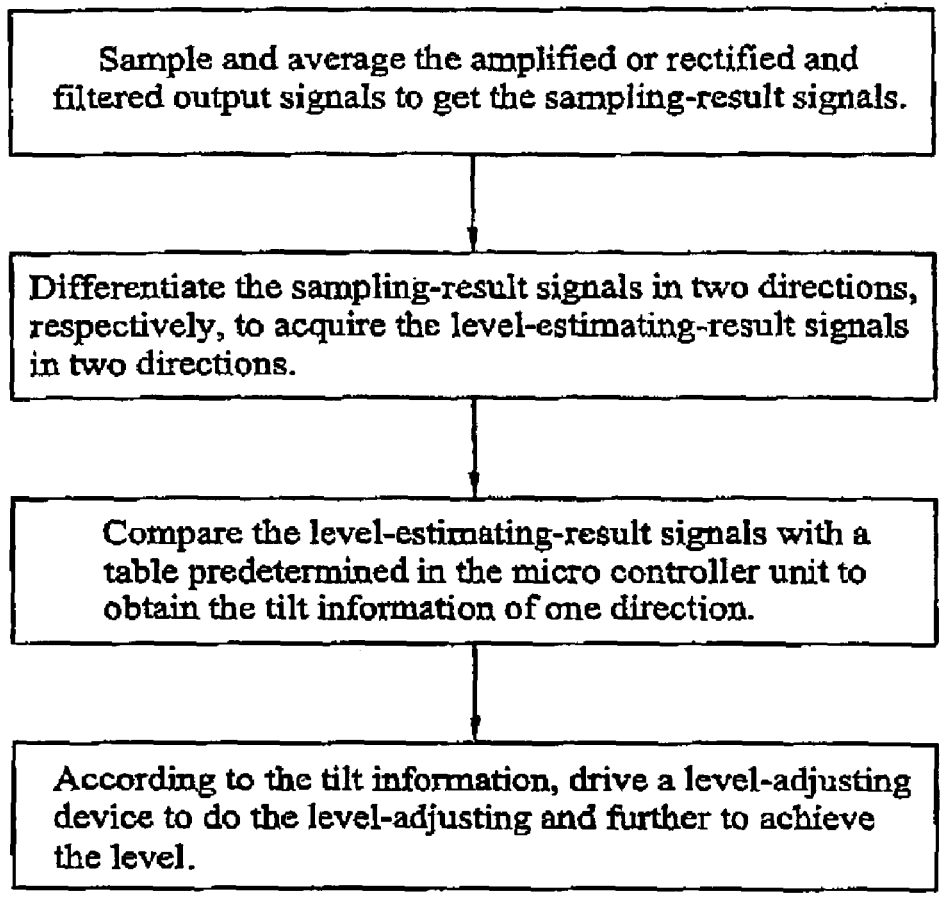
FIG. 4 illustrates the analyzing process in the micro-controller unit of the present invention.

The present invention comprises a signal-generating module, an amplifier or a rectifier and a filter, and a micro-controller unit, wherein the micro-controller unit comprises a sampling module and a differential and hold module. The signal-generating module can be a signal generator or a pulse generating circuit. The tilt sensor can be a single axis electrolytic tilt sensor or a dual axis electrolytic tilt sensor. The sampling module is a sampling circuit. The differential and hold module is a differential amplifier, a subtractor or a micro-controller. The signal-generating module regularly generates a plurality of level-measuring signals at equally timed intervals and sends the signals to the tilt sensor unidirectionally. According to the slant, the tilt sensor outputs a plurality of positive and negative output signals containing the tilt information to the amplifier or the rectifier and the filter. The output signals are amplified or rectified and filtered and sent to the micro-controller unit to be analyzed. The sampling module in the micro-controller unit samples and averages the amplified or rectified and filtered output signals and gets sampling-result signals. The differential and hold module in the micro-controller unit differentiates the level reference signals and the sampling-result signals in two directions alternately to acquire the level-estimating-result signals in the two directions, respectively. By comparing the level-estimating-result signals with a tilt angle table preprogrammed in the micro-controller unit, the tilt angle information of at least one direction is obtained. A leveling device is driven in accordance with the tilt angle information to do the leveling and further to achieve the horizontal. The analyzing process in the micro-controller unit is illustrated in FIG. 4.

Two embodiments are provided in the following to describe the present invention in detail.

Figure 5:
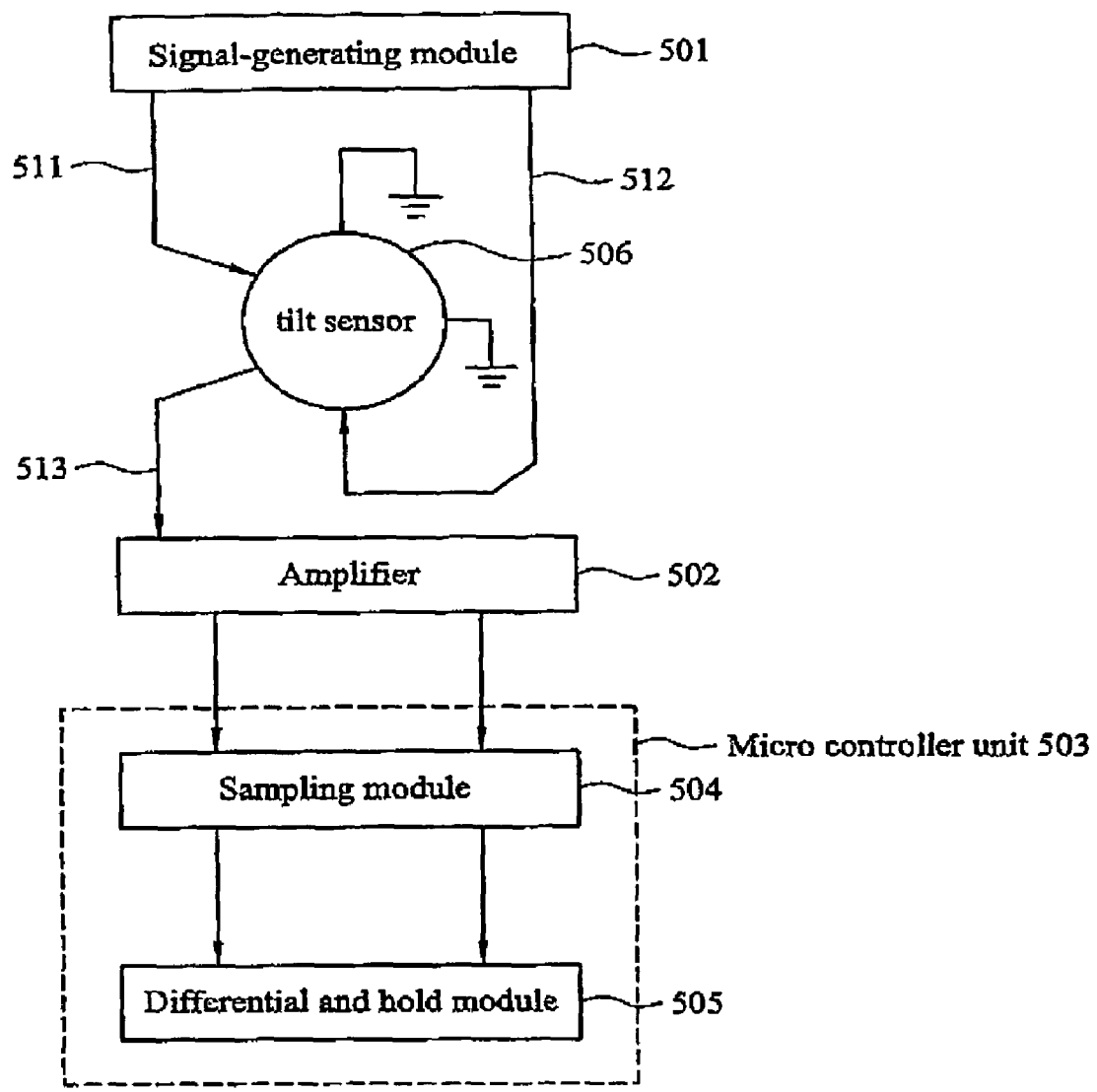
FIG. 5 illustrates the flow diagram of the embodiment according to the present invention.
Figure 6:
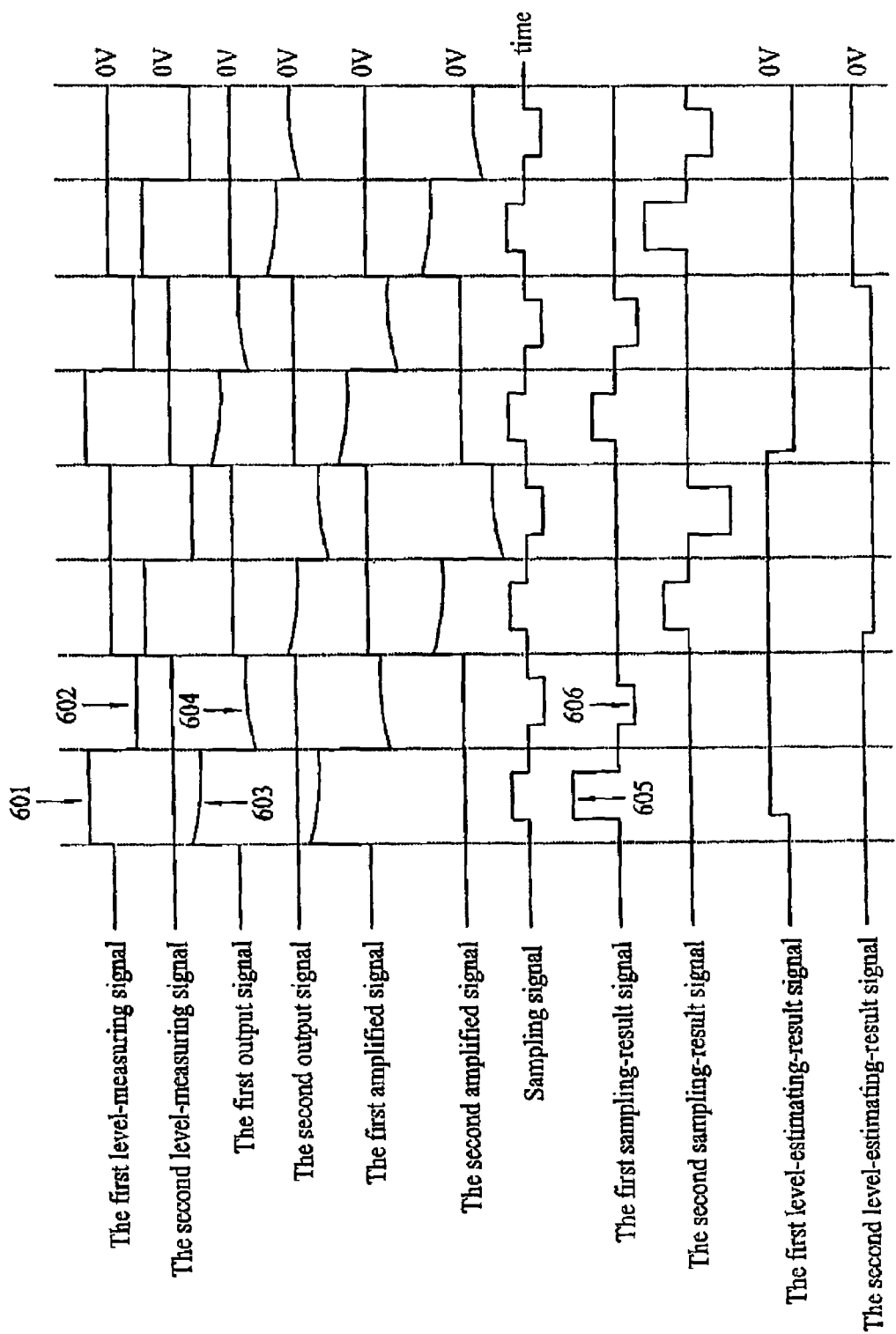
FIG. 6 illustrates the signal diagram of the embodiment according to the present invention.

The First Embodiment:

FIG. 5 and FIG. 6 illustrate the flow diagram and the signal diagram of the embodiment, respectively. The present invention comprises a signal-generating module 501, an amplifier 502, and a micro-controller unit 503, wherein the micro-controller unit 503 comprises a sampling module 504 and a differential and hold module 505. First, the signal-generating module 501 generates a plurality of regularly timed level-measuring signals, the first level-measuring signal 511 and the second level-measuring signal 512, wherein each level-measuring signal is composed of a plurality of a first voltage 601 representing the positive voltage and a second voltage 602 representing the negative voltage. These level-measuring signals have the same pulse width and are spaced at one certain interval or a plurality of intervals. And they are alternately and unidirectional sent to the input pins of the tilt sensor 506. Then, the tilt sensor 506 sequentially outputs the corresponding output signals 513 (the first output signal and the second output signal shown in FIG. 6) from the output pin to the amplifier 502, wherein the output signals are composed of a third voltage 603 representing the positive voltage and a fourth voltage 604 representing the negative voltage. After the amplifier 502 amplifies these output signals, the first amplified signal and the second amplified signal are sent to the micro-controller unit 503.

In the micro-controller unit 503, a sampling frequency is preprogrammed in the sampling module 504. The sampling frequency is set at 64 times per second in the embodiment, but can be set in accordance with the real condition in practice. The sampling module 504 samples and averages the first amplified signal and the second amplified signal in accordance with the sampling frequency. Then, the first sampling-result signal and the second sampling-result signal that are composed of a plurality of the fifth voltage 605 representing the positive voltage and the sixth voltage 606 representing the negative voltage is obtained. The differential and hold module 505 differentiates the fifth voltage 605 and the sixth voltage 606 as shown in FIG. 6 to generate the first and the second level-estimating-result signals and holds them to the next cycle. By comparing the level-estimating-result signals with the tilt angle table preprogrammed in the micro-controller unit 503, the tilt angle information of at least one direction is obtained. The tilt information is used to determine the slant and to drive a leveling device (not shown in the drawing). After many iterations and adjustments, the horizontal level is achieved.

Figure 7:
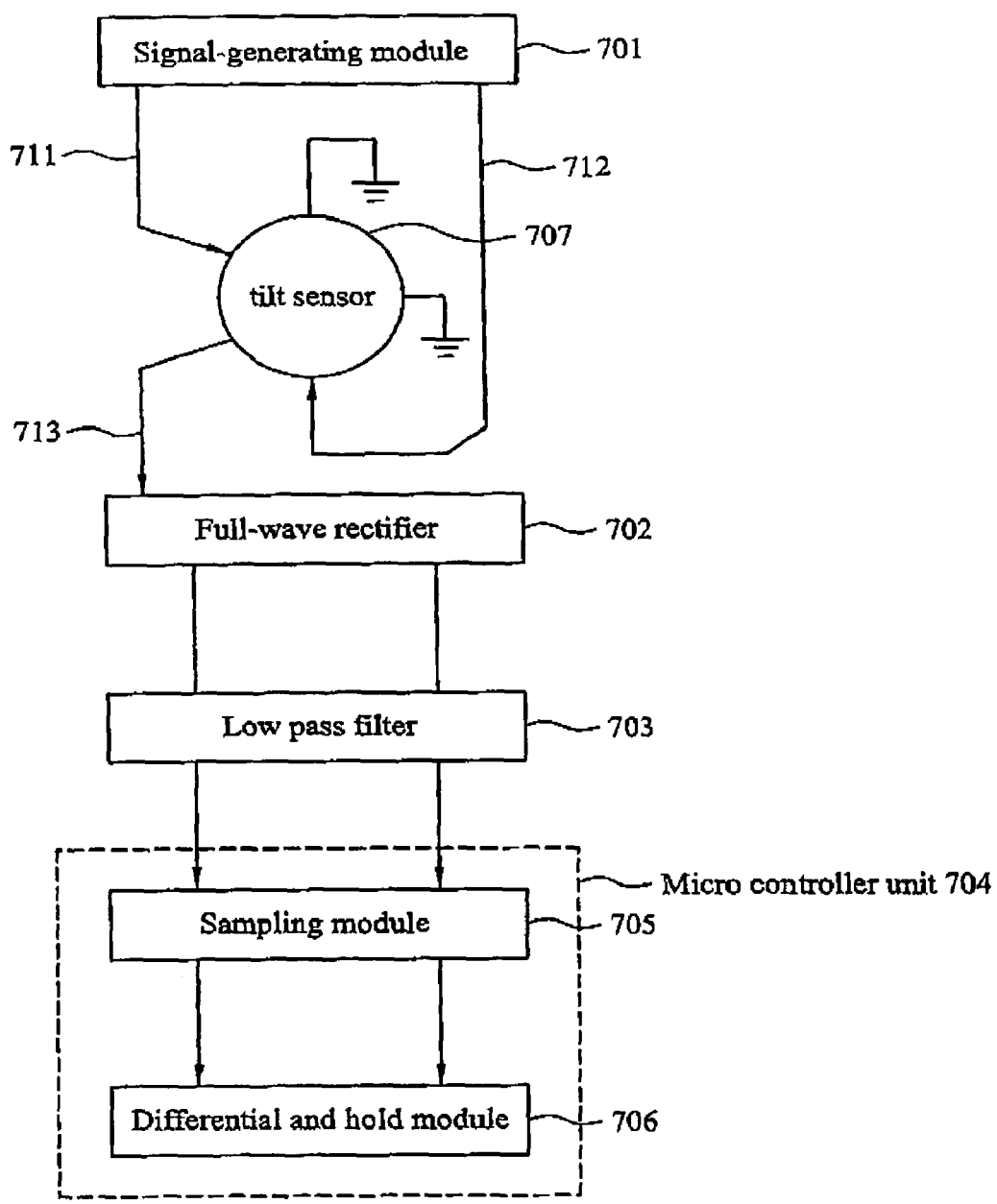
FIG. 7 illustrates the flow diagram of the other embodiment according to the present invention.
Figure 8:
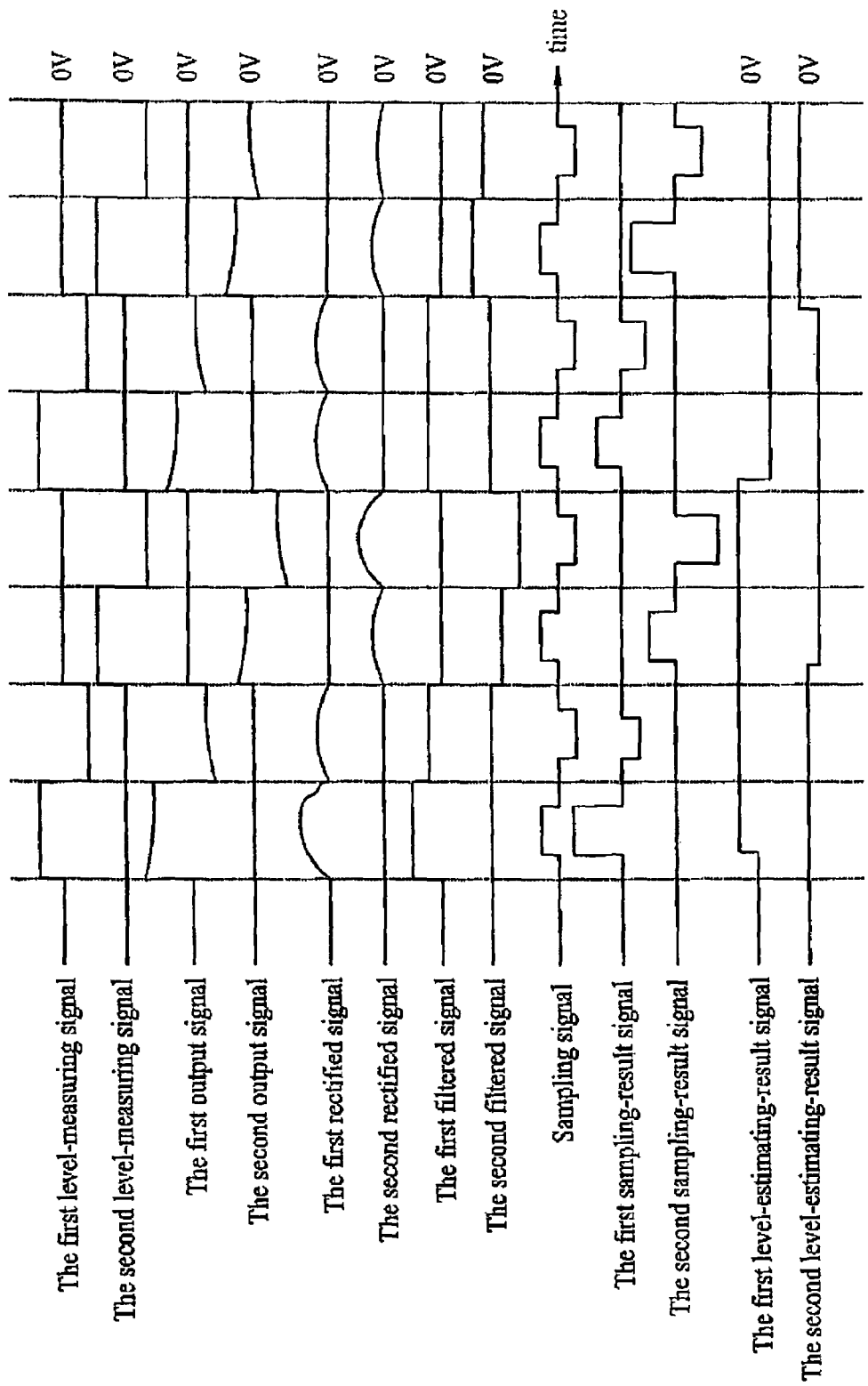
FIG. 8 illustrates the signal diagram of the other embodiment according to the present invention.

The Second Embodiment:

FIG. 7 and FIG. 8 illustrate the flow diagram and the signal diagram of the embodiment, respectively. The embodiment comprises a signal-generating module 701, a full-wave rectifier 702, a low pass filter 703, and a micro-controller unit 704, wherein the micro-controller unit 704 comprises a sampling module 705 and a differential and hold module 706. The differences between the first and the second embodiments are that the amplifier 502 is replaced with the full-wave rectifier 702 and the low pass filter 703. Therefore, the first output signal and the second output signal from the tilt sensor 707 go through the full-wave rectifier 702 instead of the amplifier. Then, the first rectified signal and the second rectified signal are received and sent to the low pass filter 703 to obtain the first filtered signal and the second filtered signal. They are then sent to the micro-controller unit 704. Other components are the same as described with reference to the first embodiment.

Hence, from the embodiments of the present invention, the advantages of the present invention are as follows. First, an amplifier is used in the present invention, so the processing time of the signals is shortened. Second, the signals are amplified by the amplifier in the present invention, so the level-measuring sensitivity is increased.

As is understood by a person skilled in the art, the foregoing preferred embodiments of the present invention are illustrative of the present invention rather than limiting of the present invention. It is intended that various modifications and similar arrangements are covered within the spirit and scope of the appended claims, the scope of which should be accorded the broadest interpretation so as to encompass all such modifications and similar structures.

What is claimed is:

1. A level-measuring circuit, set in a device, suitable to measure the tilt angle between the device and a horizontal, the level-measuring circuit comprising:
   a tilt sensor comprising an output pin, at least a first input pin set beside one side of the output pin, and an electrically conductive electrolyte between the first input pin and the output pin;
   a signal-generating module generating a set of level-measuring signals comprising a first voltage and a second voltage, wherein the set of level-measuring signals are input to the first input pin, so the tilt sensor outputs a set of output signals from the output pin, and the set of output signals comprise a third voltage and a fourth voltage;
   an amplifier receiving and amplifying the set of output signals and then sending out the set of amplified output signals; and
   a micro-controller unit receiving the set of amplified output signals and sampling and averaging the third voltage and the fourth voltage of the set of amplified output signals by a sampling frequency to get a fifth voltage and a sixth voltage, and then differentiating the fifth voltage and the sixth voltage to generate a level-estimating-result signal corresponding to the tilt angle.

2. The level-measuring circuit of claim 1, wherein the first voltage and the second voltage are symmetrically positive and negative.

3. The level-measuring circuit of claim 1, wherein the signal-generating module is a signal generator or a pulse generating circuit.

4. The level-measuring circuit of claim 1, wherein the tilt sensor is a single axis electrolytic tilt sensor or a dual axis electrolytic tilt sensor.

5. The level-measuring circuit of claim 1, wherein the micro-controller unit comprises a sampling module and a differential and hold module.

6. The level-measuring circuit of claim 5, wherein the sampling module is a sampling circuit.

7. The level-measuring circuit of claim 5, wherein the differential and hold module is a differential amplifier, a subtractor or a micro-controller.

8. The level-measuring circuit of claim 1, wherein the level-measuring signals are identically timed and are spaced at one or a plurality of intervals.

9. A level-measuring circuit, suitable for use in a tilt sensor, wherein the tilt sensor comprises an output pin, at least a pair of a first input pin and a grounded second input pin set symmetrically about the output pin, and an electrically conductive electrolyte between the first input pin and the output pin and between the second input pin and the output pin, the level-measuring circuit comprising:
   a signal-generating module regularly generating a plurality of level-measuring signals with positive and negative voltages at equally timed intervals and unidirectionally sending the level-measuring signals to the first input pin, such that the output pin of the tilt sensor outputs a plurality of output signals with positive and negative voltages in an order corresponding to the level-measuring signals;
   a rectifying and filtering device receiving the output signals with positive and negative voltages and sending out the rectified and filtered output signals with positive and negative voltages;
   a micro-controller unit receiving the rectified and filtered output signals with positive and negative voltages and sampling and averaging the rectified and filtered output signals with positive and negative voltages by a preprogrammed sampling frequency, then differentiating the averages of the positive and negative voltages of the output signals to generate a plurality of level-estimating-result signals and getting the tilt information of at least one direction by comparing the level-estimating-result signals with the table preprogrammed in the micro-controller unit.

10. The tilt estimating circuit of claim 9, wherein the signal-generating module is a signal generator or a pulse generating circuit.

11. The tilt estimating circuit of claim 9, wherein the tilt sensor is a single axis electrolytic tilt sensor or a dual axis electrolytic tilt sensor.

12. The tilt estimating circuit of claim 9, wherein the micro-controller unit comprises a sampling module and a differential and hold module.

13. The tilt estimating circuit of claim 12, wherein the sampling module is a sampling circuit.

14. The tilt estimating circuit of claim 12, wherein the differential and hold module is a differential amplifier, a subtractor or a micro-controller.

15. The tilt estimating circuit of claim 9, wherein the level-measuring signals are identically timed and are spaced at one or a plurality of intervals.

16. A processing method for signals, suitable in a micro-controller unit of a level-measuring circuit, the processing method for signals comprising:
   preprogramming a sampling frequency;
   sampling, according to the sampling frequency, a plurality of amplified or rectified and filtered output signals with positive and negative voltages sent to the micro-controller unit;
   averaging the output signals with positive and negative voltages in accordance with the sampling frequency;
   differentiating and holding the averaged output signals with positive and negative voltages to get a level-estimating-result signal; and
   obtaining the tilt information of one direction by comparing the level-estimating-result signal with the table preprogrammed in the micro-controller unit.

17. The processing method for signals of claim 16, wherein the micro-controller unit comprises a sampling module and a differential and hold module.

18. The processing method for signals of claim 17, wherein the sampling module is a sampling circuit.

19. The processing method for signals of claim 17, wherein the differential and hold module is a differential amplifier, a subtractor or a micro-controller.

20. The processing method for signals of claim 16, wherein the output signals with positive and negative voltages are identically timed and are spaced at one or a plurality of intervals.

21. A signal processing method of a level-measuring circuit, suitable in a tilt sensor, wherein the tilt sensor comprises an output pin, at least a pair of a first input pin and a grounded second input pin set symmetrically about the output pin, and an electrically conductive electrolyte between the first input pin and the output pin and between the second input pin and the output pin, the signal processing method of a level-measuring circuit comprising:

a signal-generating module regularly generating a plurality of level-measuring signals with positive and negative voltages at equally timed intervals, and unidirectionally sending the level-measuring signals to the first input pin such that the output pin of the tilt sensor outputs a plurality of output signals with positive and negative voltages in order corresponding to the level-measuring signals;

a rectifying and filtering device receiving the output signals with positive and negative voltages and sending out the rectified and filtered output signals with positive and negative voltages to a micro-controller unit;

preprogramming a sampling frequency in the micro-controller unit and sampling and averaging the rectified and filtered output signals with positive and negative voltages by the preprogrammed sampling frequency;

differentiating the averages of the positive and negative voltages of the output signals to generate a plurality of level-estimating-result signals and holding the level-estimating-result signals to the next cycle; and obtaining the tilt information of at least one direction by comparing the level-estimating-result signals with the table preprogrammed in the micro-controller unit.

22. The signal processing method of a level-measuring circuit of claim 21, wherein the signal-generating module is a signal generator or a pulse generating circuit.

23. The signal processing method of a level-measuring circuit of claim 21, wherein the tilt sensor is a single axis electrolytic tilt sensor or a dual axis electrolytic tilt sensor.

24. The signal processing method of a level-measuring circuit of claim 21, wherein the micro-controller unit comprises a sampling module and a differential and hold module.

25. The signal processing method of a level-measuring circuit of claim 24, wherein the sampling module is a sampling circuit.

26. The signal processing method of a level-measuring circuit of claim 24, wherein the differential and hold module is a differential amplifier, a subtractor or a micro-controller.

27. The signal processing method of a level-measuring circuit of claim 21, wherein the level-measuring signals with positive and negative voltages are identically timed and are spaced at one or a plurality of intervals.

28. A signal processing method of a level-measuring circuit, suitable in a tilt sensor, wherein the tilt sensor comprises an output pin, at least a pair of a first input pin and a grounded second input pin set symmetrically on each side of the output pin, and an electrically conductive electrolyte between the first input pin and the output pin and between the second input pin and the output pin, the signal processing method of a level-measuring circuit comprising:

a signal-generating module regularly generating a plurality of level-measuring signals with positive and negative voltages at equally timed intervals, and unidirectionally sending the level-measuring signals to the first input pin such that the output pin of the tilt sensor outputs a plurality of output signals with positive and negative voltages in an order corresponding to the level-measuring signals;

an amplifier receiving the output signals with positive and negative voltages and sending out the amplified output signals with positive and negative voltages to a micro-controller unit;

preprogramming a sampling frequency in the micro-controller unit and sampling and averaging the amplified output signals with positive and negative voltages by the preprogrammed sampling frequency;

differentiating the averages of the positive and negative voltages of the output signals to generate a plurality of level-estimating-result signals and holding the level-estimating-result signals to the next cycle; and obtaining the tilt information of at least one direction by comparing the level-estimating-result signals with the table preprogrammed in the micro-controller unit.

29. The signal processing method of a level-measuring circuit of claim 28, wherein the signal-generating module is a signal generator or a pulse generating circuit.

30. The signal processing method of a level-measuring circuit of claim 28, wherein the tilt sensor is a single axis electrolytic tilt sensor or a dual axis electrolytic tilt sensor.

31. The signal processing method of a level-measuring circuit of claim 28, wherein the micro-controller unit comprises a sampling module and a differential and hold module.

32. The signal processing method of a level-measuring circuit of claim 31, wherein the sampling module is a sampling circuit.

33. The signal processing method of a level-measuring circuit of claim 31, wherein the differential and hold module is a differential amplifier, a subtractor or a micro-controller.

34. The signal processing method of a level-measuring circuit of claim 28, wherein the level-measuring signals with positive and negative voltages are identically timed and are spaced at one or a plurality of intervals.

* * * * *